US012011054B2

(12) United States Patent
Jordaan

(10) Patent No.: US 12,011,054 B2
(45) Date of Patent: Jun. 18, 2024

(54) BAFFLED INSULATING GARMENT / BLANKET PANEL

(71) Applicant: Amer Sports Canada Inc., North Vancouver (CA)

(72) Inventor: Anna Elizabeth Jordaan, North Vancouver (CA)

(73) Assignee: Amer Sports Canada Inc., North Vancouver (CA)

( * ) Notice: Subject to any disclaimer, the term of this patent is extended or adjusted under 35 U.S.C. 154(b) by 117 days.

(21) Appl. No.: 17/508,282

(22) Filed: Oct. 22, 2021

(65) Prior Publication Data

US 2023/0126069 A1     Apr. 27, 2023

(51) Int. Cl.
  *A41D 31/06*      (2019.01)
  *A41D 1/02*       (2006.01)
  *D06J 1/00*       (2006.01)

(52) U.S. Cl.
  CPC ............ *A41D 31/065* (2019.02); *A41D 1/02* (2013.01); *A41D 2400/10* (2013.01); *D06J 1/00* (2013.01)

(58) Field of Classification Search
  CPC . A41D 3/00; A41D 3/02; A41D 27/24; A41D 13/002; A41D 31/06; A41D 31/065; A41D 31/02; A41D 2300/50; A41D 2400/10; D06J 1/00
  USPC .................................................. 2/97, 93, 458
  See application file for complete search history.

(56) References Cited

U.S. PATENT DOCUMENTS

| 2,464,380 | A | | 3/1949 | Daiber | |
|---|---|---|---|---|---|
| 3,169,298 | A | * | 2/1965 | Tachibana | A41D 13/0125 66/193 |
| 3,805,720 | A | | 4/1974 | Hunt | |
| 4,115,610 | A | | 9/1978 | Wortman | |
| 4,354,281 | A | * | 10/1982 | Satoh | A47G 9/086 5/413 R |
| 4,884,303 | A | * | 12/1989 | Scherer | A47G 9/086 5/413 R |
| 5,713,079 | A | * | 2/1998 | Simon | A41D 3/00 2/243.1 |

(Continued)

FOREIGN PATENT DOCUMENTS

| JP | 2006037971 | 2/2006 |
|---|---|---|
| KR | 100906407 | 7/2009 |

(Continued)

*Primary Examiner* — Jameson D Collier
*Assistant Examiner* — Matthew R Marchewka
(74) *Attorney, Agent, or Firm* — Terence P. O'Brien; Todd A. Rathe

(57) ABSTRACT

A baffled insulating garment/blanket panel may include a first layer, a second layer, an insulating particle layer and a third layer. The second layer may have folds forming trough-shaped walls comprising a first wall, a second wall and a third wall, each of which is secured to the first wall. The insulating particle layer may include a first portion between the first wall and the second wall and sandwiched between the first layer and the second layer and a second portion between the second wall and the third wall and sandwiched between the first layer and the second layer. The third layer may include folds forming consecutive trough-shaped walls comprising a fourth wall secured within the first wall and a fifth wall secured within the third wall, wherein portions of the third layer between the fourth wall and the fifth wall span across a top of the second wall.

19 Claims, 8 Drawing Sheets

(56) References Cited

U.S. PATENT DOCUMENTS

| | | | |
|---|---|---|---|
| 7,094,714 B2 | 8/2006 | Lap et al. | |
| 7,818,834 B2 | 10/2010 | Li | |
| 8,578,516 B2 | 11/2013 | Li | |
| 10,779,587 B2 | 9/2020 | Maud | |
| 10,966,477 B2 | 4/2021 | Baker | |
| 2002/0016984 A1* | 2/2002 | Poholski | A41D 13/0058 |
| | | | 607/108 |
| 2004/0259443 A1 | 12/2004 | Lap et al. | |
| 2008/0307566 A1 | 12/2008 | Yeh | |
| 2010/0024701 A1 | 2/2010 | Li | |
| 2013/0177731 A1 | 7/2013 | Moriarty | |
| 2013/0309929 A1 | 11/2013 | Thiet | |
| 2014/0250575 A1* | 9/2014 | Man | B32B 5/26 |
| | | | 112/117 |
| 2015/0044400 A1 | 2/2015 | Li | |
| 2015/0118438 A1* | 4/2015 | Yui | B32B 27/12 |
| | | | 428/101 |
| 2017/0280802 A1* | 10/2017 | Park | A41D 3/00 |
| 2021/0085006 A1* | 3/2021 | Patton | A47G 9/086 |
| 2022/0378129 A1* | 12/2022 | Brandt | D04H 18/02 |

FOREIGN PATENT DOCUMENTS

| | | | |
|---|---|---|---|
| KR | 100915959 | 9/2009 | |
| KR | 20100080739 | 7/2010 | |
| KR | 20100082673 | 7/2010 | |
| KR | 101024088 | 3/2011 | |
| KR | 101024274 | 3/2011 | |
| KR | 101569352 | 11/2015 | |
| WO | 2015137659 | 9/2015 | |
| WO | WO-2020242505 A1 * | 12/2020 | A41D 3/00 |

\* cited by examiner

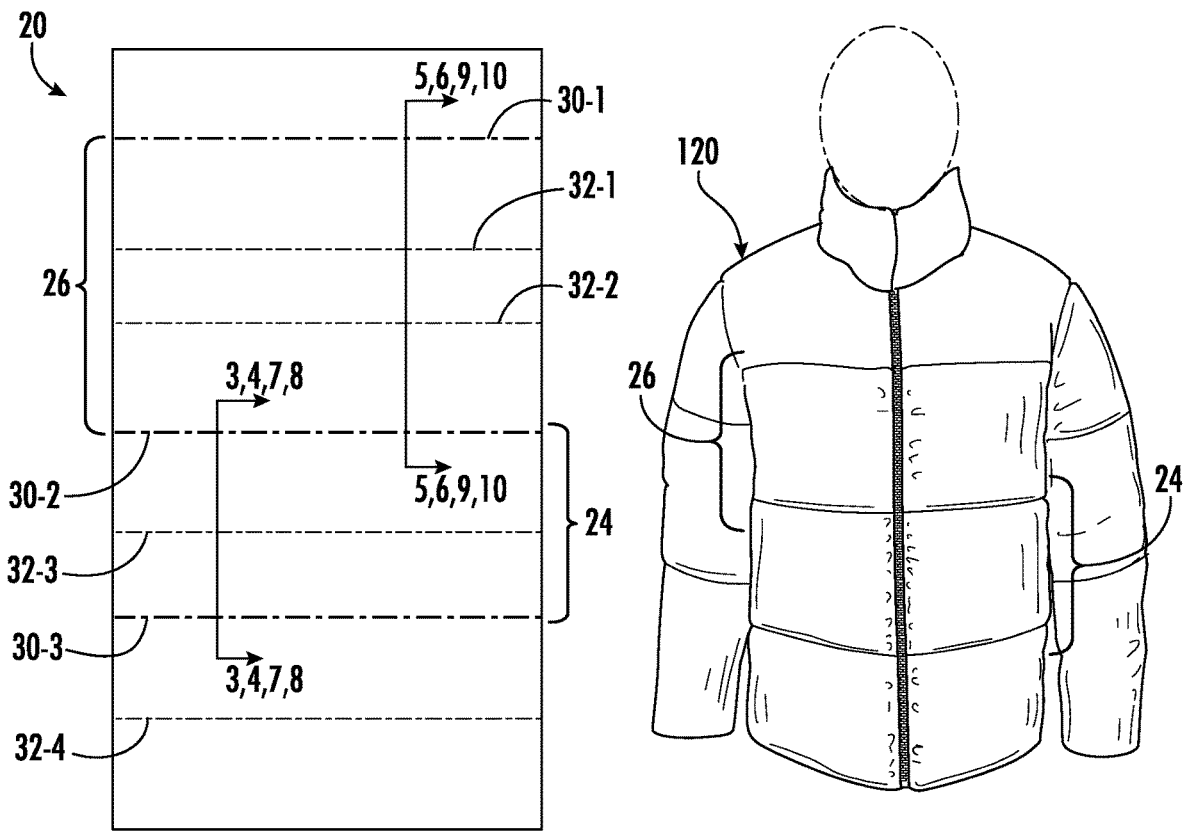
FIG. 1
FIG. 2A
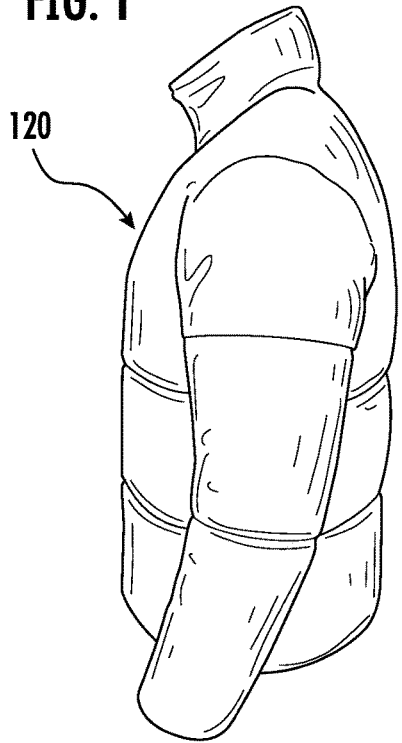
FIG. 2B
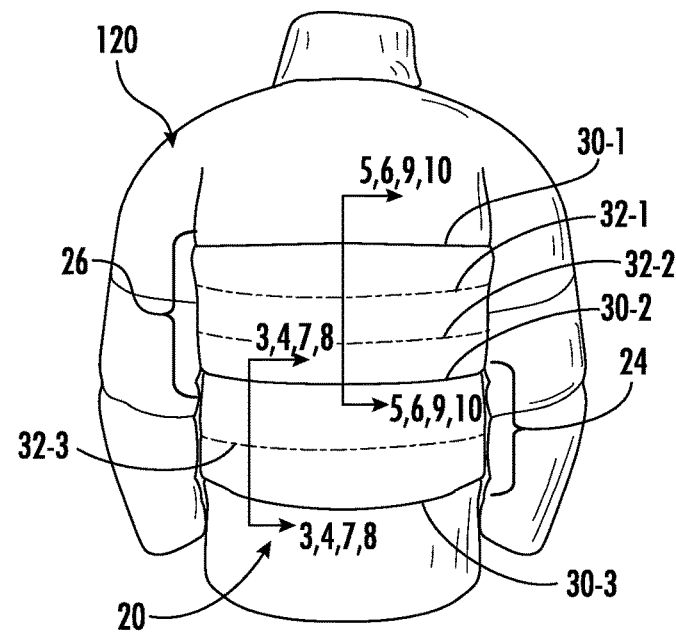
FIG. 2C

BAFFLED INSULATING GARMENT / BLANKET PANEL

BACKGROUND

Insulating panels in blankets and garments may include a layer of insulating particles. The insulating particles may comprise feathers, down, natural and synthetic fibers or combinations thereof. Laundering of the blanket or garment may result in the insulating particles escaping or protruding through stitch openings or other openings of the panels.

BRIEF DESCRIPTION OF THE DRAWINGS

FIG. 1 is a plan view of portions of an example baffled insulating garment/blanket panel.

FIG. 2A is a front perspective view of an example garment including the example panel of FIG. 1.

FIG. 2B is a side perspective view of the example garment of FIG. 2A.

FIG. 2C is a rear perspective view of the example garment of FIG. 2A.

Figure 3:
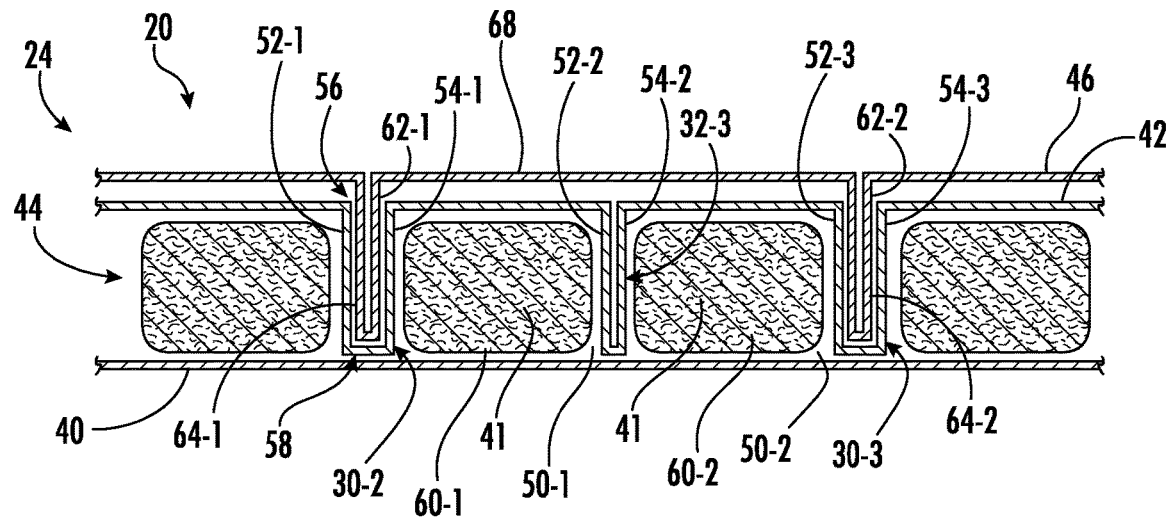
FIG. 3 is a sectional view of portions of the example panel of FIG. 1 taken along line 3-3 of FIGS. 1 and 2C.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example baffled insulating garment/blanket panels and example baffled insulating garment/blanket panel forming methods that may provide a more aesthetically pleasing outer appearance and that may reduce the extent to which insulating particles protrude following laundering of a blanket or garment. The disclosed example insulating panels and panel forming methods may be used to reduce the total number of stitches in the panel while maintaining securement of an insulating particle layer. In some implementations, the example panels may include multiple insulating particle layers including a first insulating particle layer captured between a pair of consecutive walls (sometimes referred to as "baffles") and a second insulating particle layer that extends over and spans across a top of at least one of the consecutive walls. The second insulating particle layer assists in concealing the underlying wall and associated stitching.

FIG. 1 is a plan view illustrating portions of an example baffled insulating garment/blanket panel 20. Panel 20 may be employed as part of a larger insulating blanket or garment. Examples of such a garment may include, but not limited to, a coat, jacket, vest, ski bib, pants or the like. Panel 20 is baffled, meaning that panel 20 comprises baffles or walls that form multiple internal compartments. The compartments contain insulating particles. Example of insulating particles include, but are not limited to, various forms of down and/or various forms of natural and/or synthetic fibers. As will be described hereafter, panel 20 has a construction or architecture that maintains the aesthetic attractiveness of the panel while reducing the likelihood of such insulating particles escaping or protruding through an exterior of the panel following laundering of the blanket or garment.

FIGS. 2A, 2B and 2C illustrate an example garment 120, in the form of a jacket, which comprises panel 20. As shown by FIGS. 1 and 2C, panel 20 comprises double walled baffles 30-1, 30-2 and 30-3 (collectively referred to as double walled baffles 30) and single walled baffles 32-1, 32-2, 32-3, 32-4 (collectively referred to as single walled baffles 32). For purposes of this disclosure, a "baffle" refers to a structure that is configured to restrain the flow or movement of a loose material, such as insulating particles. Double walled baffles 30-2 and 30-3 and single walled baffles 32-3 form baffled region 24. Double walled baffles 30-1, 30-2 and single walled baffles 32-1, 32-2 form baffled region 26. Baffled regions 24 and 26 may differ in the density of baffle walls and/or the size of the baffled compartments.

FIG. 3 is a sectional view of baffled region 24 taken along line 3-3 of FIG. 1. As shown by FIG. 3, baffled region 24 comprises a first layer 40, second layer 42, insulating layer 44 and third layer 46. First layer 40, sometimes referred to as a liner, comprises a single continuous uninterrupted layer of fabric or other flexible material. First layer 40 cooperates with second layer 42 to form baffled compartments 50-1 and 50-2 (collectively referred to as compartments 50). Each of compartments 50 contains a portion of insulating layer 44. First layer 40 forms a floor (as seen in FIG. 3) of both of compartments 50. In some implementations, first layer 40 may serve as an innermost layer of a garment, such as garment 120 (shown in FIGS. 2A, 2B and 2C) or an exterior layer of a blanket or other insulating structure. In some implementations, additional layers may be secured to layer 40 beneath layer 40 (as seen in FIG. 3).

Second layer 42 comprise a single continuous uninterrupted layer of fabric or other flexible material. Second layer 42 extends on top of (as seen in FIG. 3) and between compartments 50. Second layer 42, sometimes referred to as an inner liner, comprises folds 52-1, 52-2 and 52-3 (collectively referred to as folds 52) which form trough-shaped walls 54-1, 54-2 and 54-3 (collectively referred to as trough walls 54), respectively. Each of trough shaped walls 54 has a top 56 and a bottom 58. Top 56 forms a mouth or opening of the trough-shaped wall 54 while bottom 58 forms the interior floor of the trough formed by the wall 54. Although walls 54 are illustrated having generally flat or rectangular bottoms 58, it should be appreciated that the folds may alternatively be configured such that walls 54 have rounded or V-shaped bottoms 58.

Insulating layer 44 is sandwiched or captured between layers 40 and 42. In some implementations, insulating layer 44 has a thickness of at least 1 cm and no greater than 3 cm, and nominally 2 cm. Insulating layer 44 is composed of multiple individual insulating particles 41 that capture air therebetween to form a layer of particles and air that inhibits the conduction of heat. Insulating layer 44 may be formed from a variety of different insulating particles 41 such as down and/or synthetic and/or natural fibers. Down refers to soft, fine fluffy feathers which may form a first covering the young bird or the insulating layer below the contour feathers of an adult bird. Down may also refer to other short hairs on plants or animals. Such down may be used alone or in combination with synthetic or natural fibers to form insulating layer 44. Due to the size of down and/or fibers, panel 20 is vulnerable to such insulating particles 41 protruding through layer 42 or escaping from compartments 50.

In some implementations, insulating layer 44 (each of its portions) comprises an 850 down fill power with an application of 80 g/m². In other implementations, insulating layer 44 may have other qualities or fill power and may have other grams per meter squared, such as down fills within the range of 20 to 150 g/m².

Insulating layer 44 comprises portions 60-1 and 60-2 (collectively referred to as portions 60) which are captured and retained within compartments 50-1 and 50-2, respectively. Portions 60 are spaced or separated from one another and from other portions of layer 44 by walls 54-1, 54-2 and 54-3. Wall 54-2 extends between portion 60-1 and 60-2 and forms single wall baffle 32-3. Single wall baffle 32-3 inhibits the flow of the insulating particles forming portions 60-1 and 60-2 between compartments 50-1 and 50-2. In some implementations, the trough-shaped wall 54-2 and the single walled baffle 32-3 formed therefrom, extends in a generally horizontal plane when garment 120 is being worn to inhibit the vertical movement of the insulating particles of portion 60-2 in compartment 50-2 into the compartment 50-1 underlying compartment 50-2.

Third layer 46 comprises a single continuous uninterrupted layer of fabric or other flexible material extending over second layer 42 (as seen in FIG. 3). Third layer 46 comprises folds 62-1 and 62-2 which form consecutive trough-shaped walls 64-1 and 64-2 (collectively referred to as walls 64), respectively. Walls 64-1 and 64-2 project into and are secured within walls 54-1 and 54-3, respectively. Walls 64-1 and 54-1 overlap one another to form double walled baffle 30-2. Walls 64-1 and 54-3 overlap one another to form double walled baffle 30-3. Due to the multiple wall construction, double walled baffles 30-2 and 30-3 may have an increased thickness, an increased rigidity and an increased strength as compared to single walled baffle 32-3.

As further shown by FIG. 3, second layer 46 further comprises a bridge region 68 that is part of a single integral unitary body with walls 64-1 and 64-2, wherein bridge region 68 continuously extends between walls 64-1 and 64-2, spanning over and across a top (as seen in FIG. 3) of the single walled baffle 32-3 formed by wall 54-2. Bridge region 68 conceals the top 56 of the trough shaped wall 54-2. As a result, even though the illustrated portion of panel 20 comprises three baffles, 30-2, 30-3 and 32-3, third wall 46 presents an upper surface (as seen in FIG. 3) in which just two tops or mouths of folds or trough-shaped walls (sometimes referred to as outer seams) are exposed. The overlapping architecture of panel 20 provides baffles of different thickness and strength along the various insulating particle containing compartments 50, provides a ratio of the number of baffles to the number of outer seams of greater than one and provides an additional outer covering layer which is securely retained in place against movement and which may inhibit the escape of insulating particles from panel 20.

Figure 4:
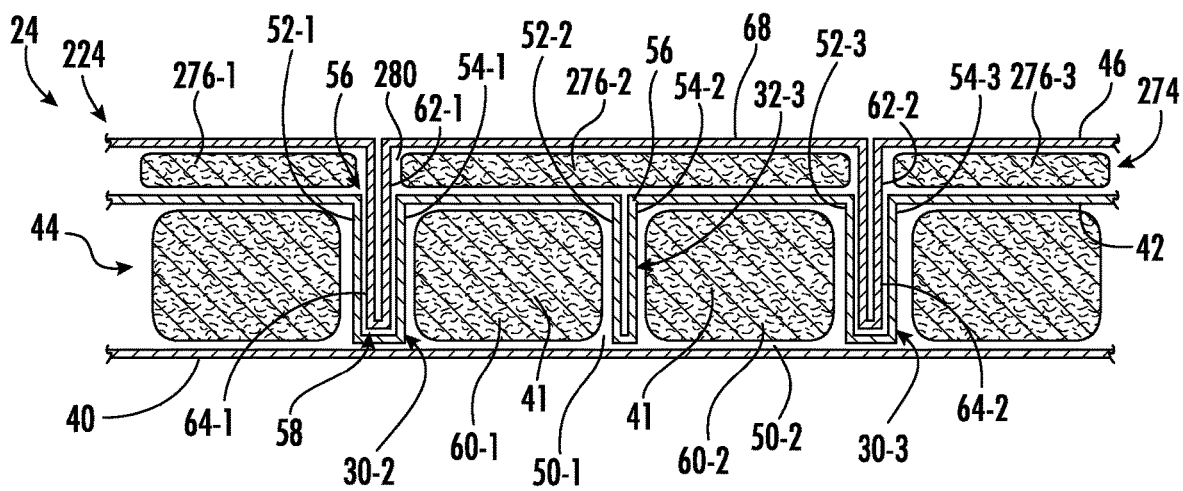
FIG. 4 is a sectional view of portions of the example panel of FIG. 1 taken along line 4-4 of FIGS. 1 and 2C.

FIG. 4 is a fragmentary sectional view illustrating baffled region 224 which may be used in place of baffled region 24. Baffled region 224 illustrates an example of how additional insulating layers may be provided in the multilayered overlapping architecture of panel 20 or garment 120. Baffled region 224 is similar to baffled region 24 described above except that baffled region 224 additionally comprises insulating layer 274. The remaining components of baffled region 224 which correspond to components of baffled region 24 are numbered similarly.

Insulating layer 274 comprises a layer of insulating particles such as down and/or synthetic or natural fibers. Insulating layer 274 is sandwiched and captured between second layer 42 and third layer 46. Insulating layer 274 is captured and retained within a baffle compartment 280 having a floor formed by the top of second layer 42 and a ceiling formed by the underside of third layer 46.

Insulating layer 274 comprises portions 276-1, 276-2 and 276-3 (collectively referred to as portions 276). Portion 276-2 extends directly over compartments 50-1 and 50-2 and continuously spans across and over the top 56 of trough wall 54-2 forming the single walled baffle 32-3. As a result, portion 276-2 further provides a layer of cushioning over the juncture of portions 60-1 and 60-2 as well as single walled baffle 32-3. Portions 276-1 and 276-3 are similar to portion 276-2 in that they continuously span across and over the top 56 of their respective underlying trough walls that form single walled baffles.

In some implementations, insulating layer 44 has a first thickness while insulating layer 274 has a second thickness less than the first thickness. In some implementations, insulating layer 274 has a thickness of no greater than 1 cm. In other implementations, insulating layer 274 has a thickness of no greater than 5 mm. In some implementations, insulating layer 274 has a thickness of at least 1 mm. In some implementations, insulating layer 274 has a nominal thickness of at least 2 mm and no greater than 3 mm. In some implementations, insulating layer 274 is formed from insulating particles having the same composition as the insulating particles of insulating layer 44. In some implementations, insulating layer 274 comprises 850 down fill power with an application of 30 g/m². In other implementations, insulating layer 274 may have a different composition of insulating particles. For example, insulating layer 274 may be formed from a different mixture of down and/or synthetic/natural fibers. The reduced thickness of most embodiments of insulating layer 274 enables baffle compartments 280 to be longer than other thicker baffle compartments. The reduced thickness of most embodiments of the insulating layer 274 retains the insulating particles in place due to the proximity to the inner surface of the third layer 46 and the outer surface of the second layer 42. The insulating material 274 inhibits the build-up of static between the second and third layers 42 and 46, and prevents the top 56 of the trough shaped walls 54 from being visible outside of the third layer 46.

Figure 5:
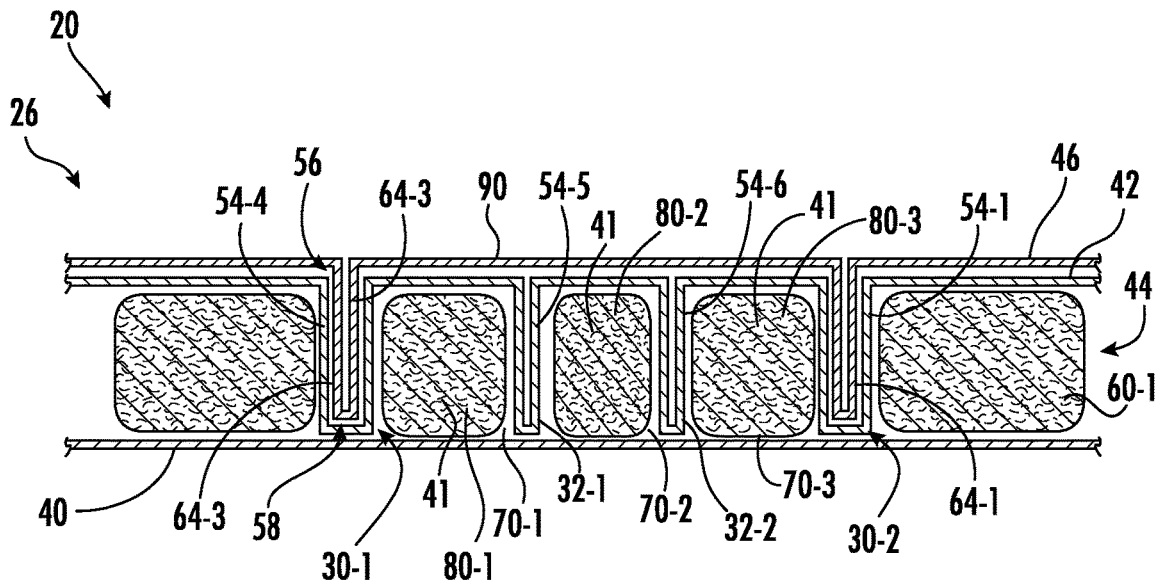
FIG. 5 is a sectional view of portions of the example panel of FIG. 1 taken along line 5-5 of FIGS. 1 and 2C.

FIG. 5 is a sectional view illustrating an example baffled region 26 of panel 20. Baffled region 26 is similar to baffled region 24 except that second layer 42 comprises an additional fold to form an additional trough wall and that insulating layer 44 comprises an additional portion of insulating particles. In some implementations, baffled region 26 may be employed to form portions of a garment, such as garment 120, where the garment may undergo more substantial bending, flexing or stress. The additional trough walls and additional baffles may serve to better retain the insulating particles in the respective baffle compartments. In some implementations, the construction of baffled region 24 is employed in those portions of a garment or blanket where the exterior stitch lines or seams (the top of folds 62/trough walls 64) are spaced less than or equal to 18 cm, whereas the construction of baffled region 26 is employed in those portions of a garment or blanket where the exterior stitch lines or seams (the top of folds 62/trough walls 64) are spaced by spacing (similar to spacing S1 in FIG. 10) that is greater than 18 cm. As the spacing between the stitch lines or seams increases, the number of additional single walled baffles 32 formed by second layer 42 between the consecutive double walled baffles 30 may be increased.

Baffled region 26 comprises the above-described trough walls 54-1 and 64-2 which form double walled baffle 30-2. Second layer 42 comprises folds which additionally form trough walls 54-4, 54-5 and 54-6. Third layer 46 comprises an additional fold which additionally forms trough wall 64-3. Trough wall 54-5 and 54-6 form single walled baffles 32-1 and 32-2. Trough wall 64-3 projects into and is secured within trough wall 54-4. Walls 64-3 and 54-4 overlap one another to form double walled baffle 30-1. Due to the two overlapping trough walls, double walled baffle 30-1 may have an increased thickness, an increased rigidity and an increased strength as compared to single walled baffles 32.

First layer 40 and second layer 42 form the bottom and top of baffle compartments 70-1, 70-2 and 70-3, respectively. Trough walls 54-4 and 54-5 form the lateral sides of compartment 70-1. Trough walls 54-5 and 54-6 form the lateral sides of compartment 70-2. Trough walls 54-6 and 54-1 form the lateral sides of compartment 70-3. In the example illustrated, compartments 70-1, 70-2 and 70-3 have different sizes, different widths. Compartments 70-1 and 70-3, which are adjacent to double walled baffles 30-3 and 30-2, respectively, have wider widths, whereas compartment 70-2, which is bordered on both sides by single walled baffles 32-1 and 32-2 has a smaller width. The smaller width of compartment 70-2 may better retain the received portion of insulating layer 44 given that both sides are bordered by a single walled baffle. In other implementations, compartments 70-1, 70-2 and 70-3 can all be formed with the same width, or substantially the same widths. In other implementations, trough walls 54-5 and 54-6 may have a spacing that is equal to the spacing of trough walls 54-5 and trough wall 54-4 and the spacing between trough wall 54-6 and trough wall 54-1. Although baffled region 26 is illustrated as having a pair of single walled baffles 32-1 and 32-2 between double walled baffles 30-3 and 30-2, in other implementations, second layer 42 may include additional folds and additional trough walls 54 between double walled baffles 30-3 and 30-2 to provide additional single walled baffles 32 between double walled baffles 30-3 and 30-2.

Insulating layer 44 comprises portions 80-1, 80-2 and 80-3 (collectively referred to as portions 80). Portions 80-1, 80-2 and 80-3 fill compartment 70-1, 70-2 and 70-3, respectively. Portion 80-1 is sandwiched between and captured within compartment 70-1. Portion 80-2 is sandwiched between and captured within compartment 70-2. Portion 80-3 is sandwiched between and captured within compartment 70-3. Each of portions 80 is composed of insulating particles 41. Such insulating particles may be in the form of down, synthetic fibers, natural fibers or combinations thereof. In the example illustrated, portion 80-2 has a smaller volume (a smaller width) as compared to portions 80-1 and 80-3 due to the smaller volume and width of compartment 70-2. In another implementation, portions 80-1, 80-2 and 80-3 can all have the same volume to match the compartments 70-1, 70-2 and 70-3 having the same width.

Similar to the portion of second layer 46 forming baffled region 24, the second layer 46 forming baffled region 26 further comprises a bridge region 90 that continuously extends between walls 64-3 and 64-1, spanning over and across a top (as seen in FIG. 5) of the single walled baffles 32-1 and 32-2 formed by walls 54-5 and 54-6, respectively. Bridge region 90 conceals the top 56 of the trough shaped walls 54-5 and 54-6. As a result, even though the illustrated portion of panel 20 comprises four baffles 30-1, 30-2, 32-1 and 32-2, third wall 46 presents an upper surface (as seen in FIG. 5) in which just two tops or mouths of folds or trough-shaped walls (sometimes referred to as outer seams) are exposed. The overlapping architecture of panel 20 provides baffles of different thickness and strength along the various insulating particle containing compartments 70, provides a ratio of the number of baffles to the number of outer seams of greater than one and provides an additional outer covering layer which is securely retained in place against movement and which may inhibit the escape of insulating particles from compartments 70.

Figure 6:
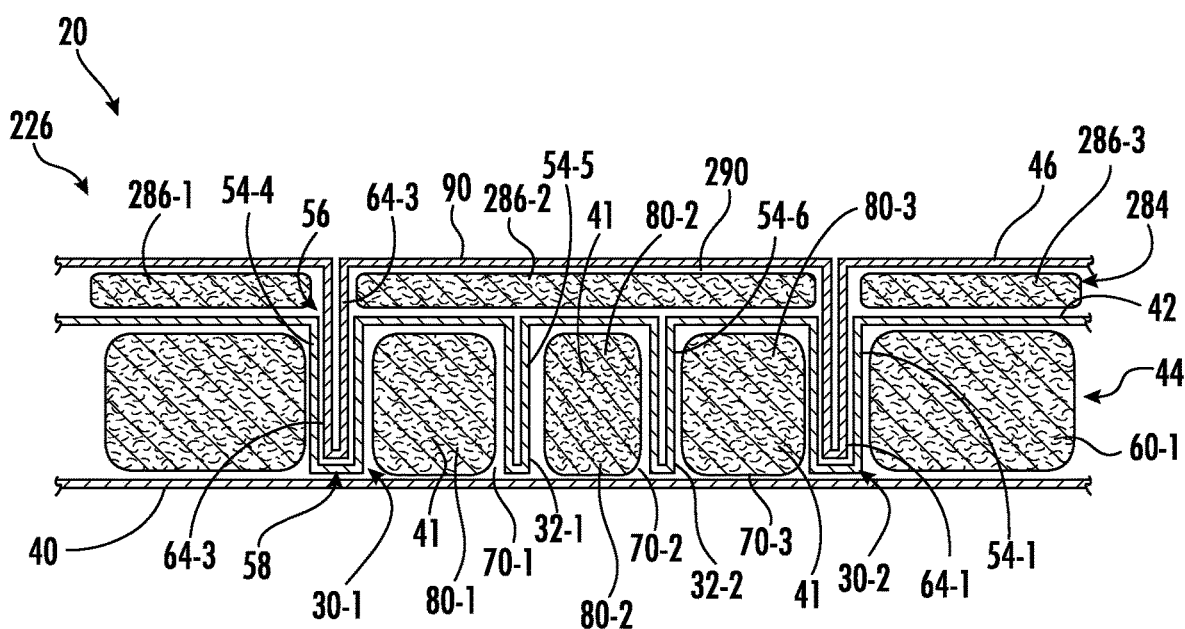
FIG. 6 is a sectional view of portions of the example panel of FIG. 1 taken along line 6-6 of FIGS. 1 and 2C.

FIG. 6 is a fragmentary sectional view illustrating baffled region 226 which may be used in place of baffled region 26. Baffled region 226 illustrates an example of how additional insulating layers may be provided in the multilayered overlapping architecture of panel 20. Baffled region 226 is similar to baffled region 26 described above except that baffled region 226 additionally comprises insulating layer 284. The remaining components of baffled region 226 which correspond to components of baffled region 26 are numbered similarly.

Insulating layer 284 comprises a layer of insulating particles such as down and/or synthetic or natural fibers. Insulating layer 284 is sandwiched in captured between second layer 42 and third layer 46. Insulating layer 284 is captured and retained within a baffle compartment 290 having a floor formed by the top of second layer 42 and a ceiling formed by the underside of third layer 46.

Insulating layer 284 comprises portions 286-1, 286-2 and 286-3 (collectively referred to as portions 286). Portion 286-2 extends directly over compartments 70-1, 70-2 and 70-3 and continuously spans across and over the top 56 of trough walls 54-5 and 54-6 forming the single walled baffles 32-1 and 32-2. As a result, portion 286-2 further provides a layer of cushioning over the juncture of portions 80-1, 80-2 and 80-3 as well as single walled baffles 32-1 and 32-2. Portions 286- and 286-3 are similar to portion 286-2 in that they continuously span across and over the top 56 of their respective underlying trough walls that form single walled baffles.

In some implementations, insulating layer 44 has a first thickness while insulating layer 284 has a second thickness less than the first thickness. In some implementations, insulating layer 284 has a thickness of no greater than 1 cm. In other implementations, insulating layer 284 has a thickness of no greater than 5 mm. In some implementations, insulating 284 has a thickness of at least 1 mm in some implementations, insulating layer 284 is formed from insulating particles having the same composition as the insulating particles of insulating layer 44. In other implementations, insulating layer 284 may have a different composition of insulating particles. For example, insulating layer 284 may be formed from a different mixture of down and/or synthetic/natural fibers. The reduced thickness of most embodiments of insulating layer 284 enables baffle compartments 290 to be longer than other thicker baffle compartments. The reduced thickness of most embodiments of the insulating layer 284 retains the insulating particles in place due to the proximity to the inner surface of the third layer 46 and the outer surface of the second layer 42. The insulating material 284 inhibits the build-up of static between the second and third layers 42 and 46, and prevents the top 56 of the trough shaped walls 54 from being visible outside of the third layer 46.

Figure 7:
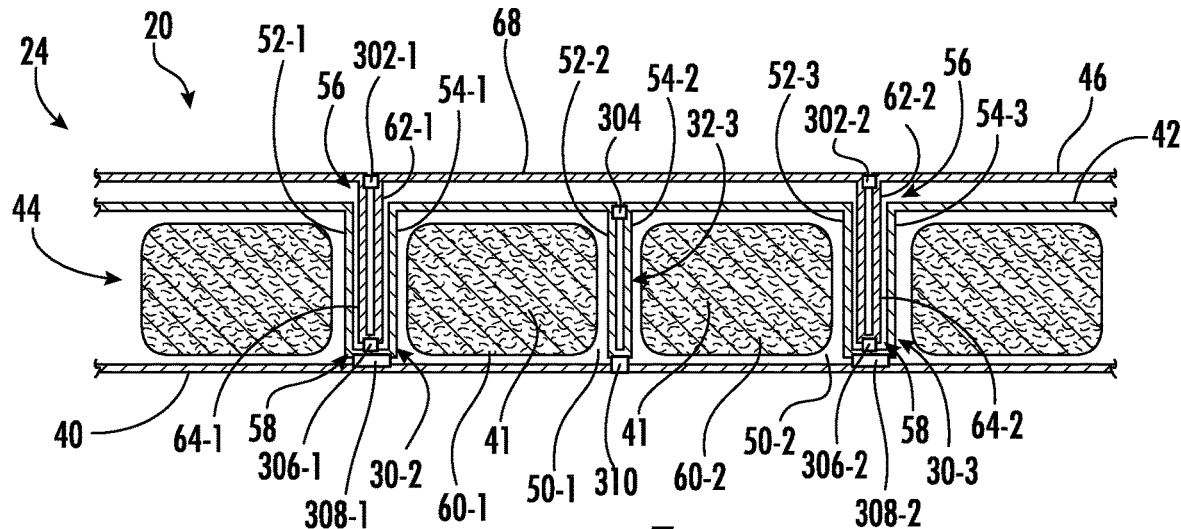
FIG. 7 is a sectional view of portions of the example panel of FIG. 1 taken along line 7-7 of FIGS. 1 and 2C.
Figure 8:
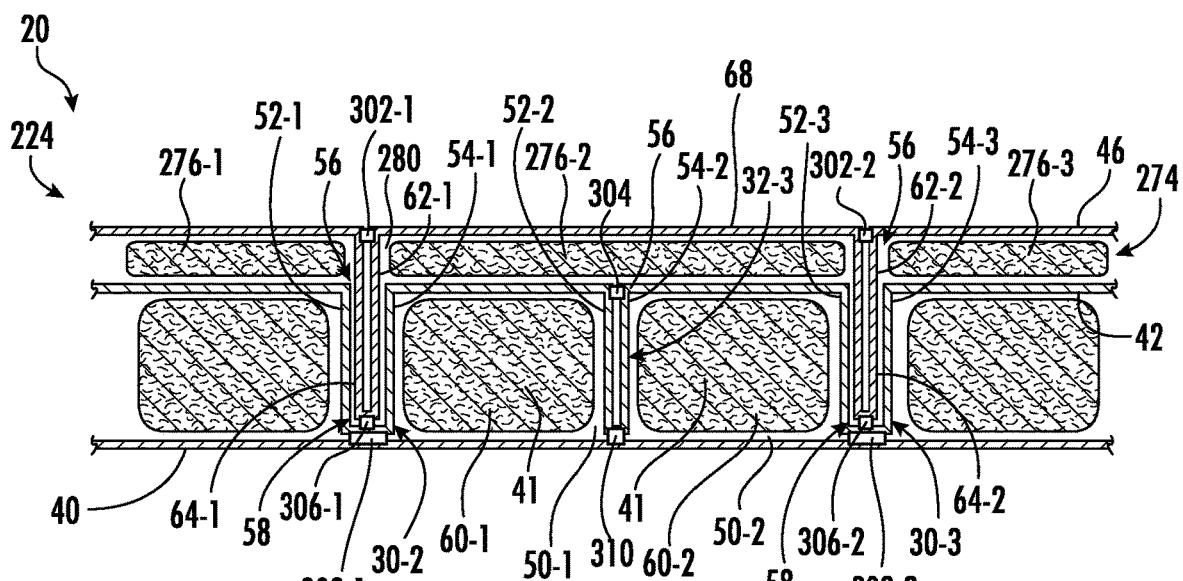
FIG. 8 is a sectional view of portions of the example panel of FIG. 1 taken along line 8-8 of FIGS. 1 and 2C.

FIGS. 7-10 illustrate baffled regions 24, 224, 26 and 226, respectively, but with the addition of connectors that secure the above-described trough walls to themselves, to other trough walls and/or to adjacent layers. As shown by FIGS. 7 and 8, baffled regions 24 and 224 comprise connectors 302-1, 302-2 (collectively referred to as connectors 302), connectors 304, connectors 306-1, 306-2 (collectively referred to as connectors 306), connectors 308-1, 308-2 (collectively referred to as connectors 308) and connector 310.

Connectors 302 connect portions of third layer 46, adjacent to tops 56 of trough walls 64-1 and 64-2, closing the mouth or top openings of such trough walls 64-1 and 64-2. In some implementations, connectors 302 may each comprise stitching. In other implementations, connectors 302 may comprise adhesive, welds or other connection structures. Connector 304 connects portions of second layer 42, adjacent to tops 56 of trough wall 54-2, closing the mouth or top openings of trough wall 54-2. In some implementations, connector 304 may comprise stitching. In other implementations, connector 304 may comprise adhesive, welds or other connection structures.

Connectors 306 secure portions of trough wall 64-1 and 64-2 within trough walls 54-1 and 54-3, respectively. In the example illustrated, connectors 306 connect the floors 58 of trough walls 64-1 and 64-2 directly to the floors of trough walls 54-1 and 54-2, respectively. In other implementations, connectors 306 may connect lower interior sides of trough walls 64-1 and 64-2 to lower interior sides of trough walls 54-1 and 54-3, respectively. In some implementations, connectors 306 may each comprise stitching. In other implementations, connectors 306 may comprise adhesive, welds or other connection structures.

Connectors 308 secure portions of trough walls 54-1 and 54-3 directly to first layer 40. In the example illustrated, connectors 308 connect the floors 58 of trough walls 54-1 and 54-3 directly to first layer 40. In other implementations, connectors 308 may connect lower sides of trough walls 54-1 and 54-3 to first layer 40. In some implementations, connectors 308 may each comprise stitching. In other implementations, connectors 308 may comprise adhesive, welds or other connection structures.

Connector 310 connects trough wall 54-2 to first wall 40. In the example illustrated, connector 310 directly connects a floor of trough wall 54-2 to first wall 40. In other implementations, connector 310 may directly connect a side or sides of trough wall 54-2 to first wall 40. In some implementations, connector 310 may comprise stitching. In other implementations, connector 310 may comprise adhesive, welds or other connection structures.

When connectors 302, 304, 306, 308 and 310 are stitchings, the stitching may be aligned in a generally horizontal direction, a generally vertical direction, or in other angled positions, with respect to the orientation of panel 20 in FIGS. 7 and 8.

Figure 9:
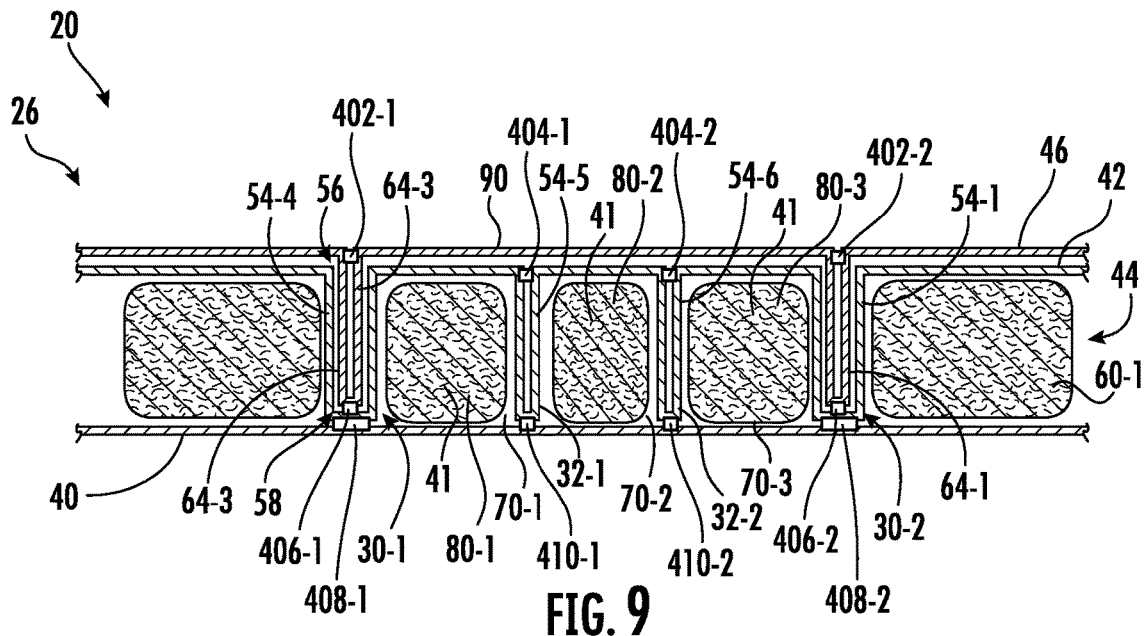
FIG. 9 is a sectional view of portions of the example panel of FIG. 1 taken along line 9-9 of FIGS. 1 and 2C.
Figure 10:
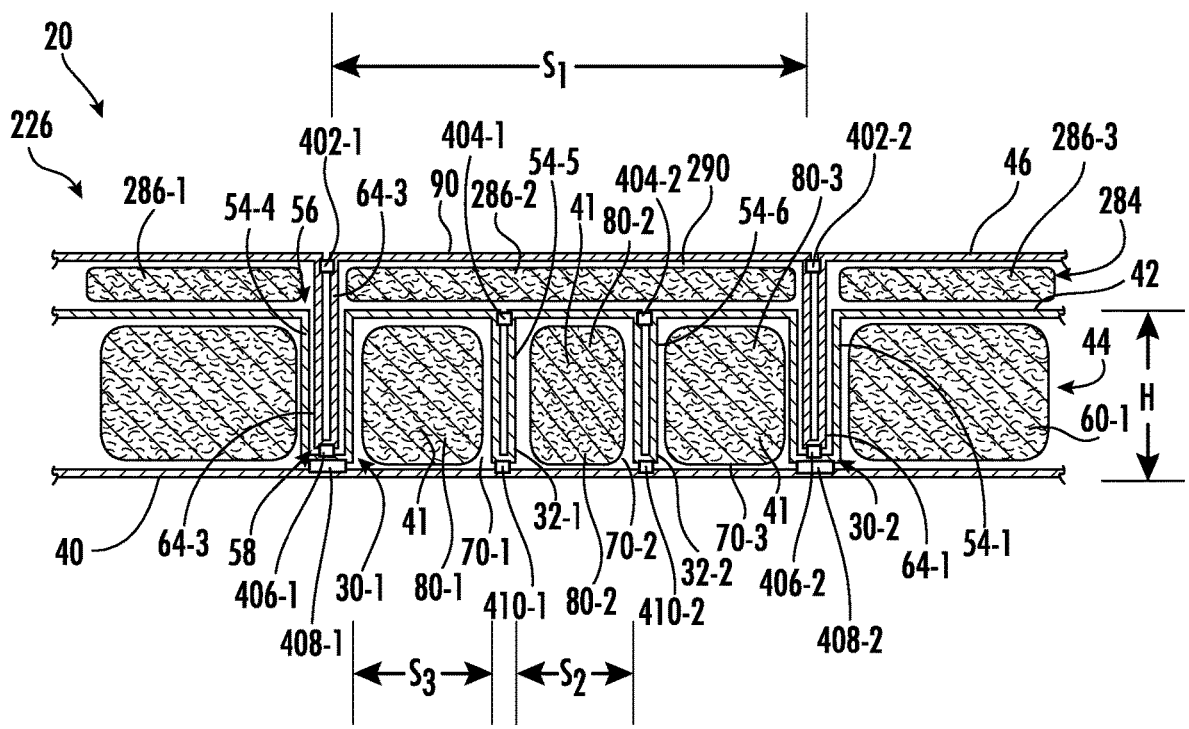
FIG. 10 is a sectional view of portions of the example panel of FIG. 1 taken along line 10-10 of FIGS. 1 and 2C.

As shown by FIGS. 9 and 10, baffled regions 26 and 226 comprise connectors 402-1, 402-2 (collectively referred to as connectors 402), connectors 404-1, 404-2 (collectively referred to as connectors 404), connectors 406-1, 406-2 (collectively referred to as connectors 406), connectors 408-1, 408-2 (collectively referred to as connectors 408) and connectors 410-1 and 410-2 (collectively referred to as connectors 410).

Connectors 402 connect portions of third layer 46, adjacent to tops 56 of trough walls 64-1 and 64-3, closing the mouth or top openings of such trough walls 64-1 and 64-3. In some implementations, connectors 402 may each comprise stitching. In other implementations, connectors 302 may comprise adhesive, welds or other connection structures. Connectors 404 connect portions of second layer 42, adjacent to tops 56 of trough walls 54-5 and 54-6, closing the mouth or top openings of such trough walls 54-5 and 54-6. In some implementations, connectors 404 may each comprise stitching. In other implementations, connectors 404 may comprise adhesive, welds or other connection structures.

Connectors 406 secure portions of trough walls 64-1 and 64-3 within trough walls 54-1 and 54-4, respectively. In the example illustrated, connectors 406 connect the floors 58 of trough wall 64-1 and 64-3 directly to the floors of trough walls 54-1 and 54-4, respectively. In other implementations, connector 406 may connect lower interior sides of trough walls 64-1 and 64-3 to lower interior sides of trough walls 54-1 and 54-4, respectively. In some implementations, connectors 406 may each comprise stitching. In other implementations, connectors 406 may comprise adhesive, welds or other connection structures.

Connectors 408 secure portions of trough walls 54-1 and 54-4 directly to first layer 40. In the example illustrated, connectors 408 connect the floors 58 of trough walls 54-1 and 54-4 directly to first layer 40. In other implementations, connectors 408 may connect lower sides of trough walls 54-1 and 54-4 to first layer 40. In some implementations, connectors 408 may each comprise stitching. In other implementations, connectors 408 may comprise adhesive, welds or other connection structures.

Connectors 410 connects trough walls 54-5 and 54-6 to first wall 40. In the example illustrated, connectors 410 directly connect a floor of trough walls 54-5 and 54-6 to first wall 40. In other implementations, connectors 410 may directly connect a side or sides of each of trough walls 54-5 and 54-6 to first wall 40. In some implementations, connectors 410 may comprise stitching. In other implementations, connectors 410 may comprise adhesive, welds or other connection structures.

When connectors 402, 404, 406, 408 and 410 are stitchings, the stitching may be aligned in a generally horizontal direction, a generally vertical direction, or in other angled positions, with respect to the orientation of panel 20 in FIGS. 9 and 10.

In the example illustrated in FIG. 10, the trough walls of the second layer 46 have a height H of at least 1 cm and no greater than 3 cm. The trough walls 64-3 and 64-1 are spaced by spacing S1 of at least 10 cm and no greater than 30 cm. In some implementations, trough walls 64-3 and 64-1 are spaced by spacing S1 of at least 12 cm and no greater than 24 cm. Trough walls 54-4 and 54-5 are spaced by spacing S2 of at least 4 cm and no greater than 9 cm. Trough walls 54-1 and 54-2 are spaced by a spacing S3 of at least 6 cm and no greater than 9 cm. Such spacings and heights may facilitate sufficient insulation as well as retention of the various portions of insulation layer 44. In other implementations, the various spacings and heights may be altered.

Figure 11:
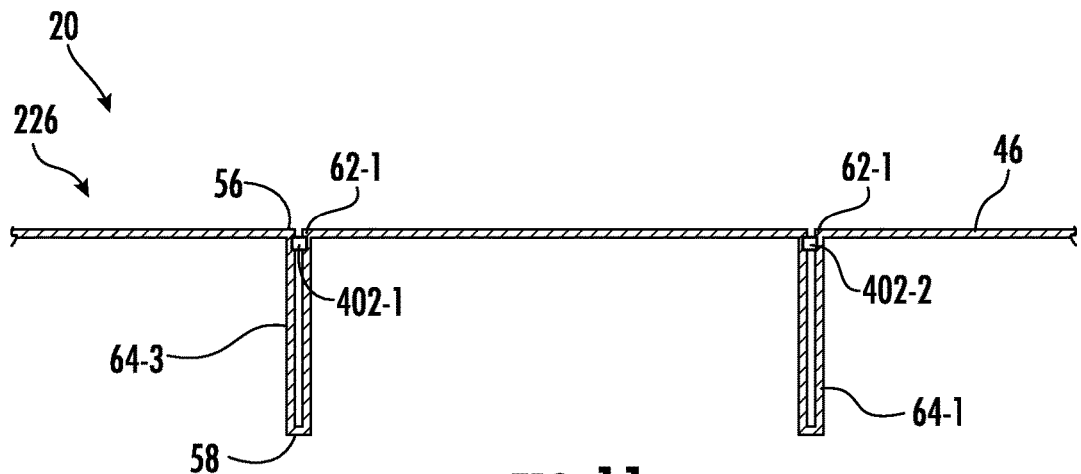
FIGS. 11, 12, 13, 14 and 15 are sectional views illustrating an example method for forming the portions of the example baffle shown in FIG. 10.

FIGS. 11-15 illustrate one example method for forming the example baffled region 226 showing FIG. 10. As shown by FIG. 11, third wall 46 is folded to form folds 62-1 and 62-3 which form consecutive trough-shaped walls 64-1 and 64-3. Each of the trough shaped walls 64 has a top 56 forming an opening or mouth and a bottom 58. In the example illustrated, the shape of each of the folds 62 is maintained by applying or forming connectors 402-1 and 402-2. As discussed above, some implementations, connectors 402 may comprise stitching. In FIG. 11, in one implementation, when connectors 402-1 and 402-2 are stitchings, the stitchings can be aligned in a generally horizontal direction with respect to the orientation of panel 20 in FIG. 11. In other implementations, the stitchings can be aligned in a generally vertical direction, or in other angled positions.

Figure 12:
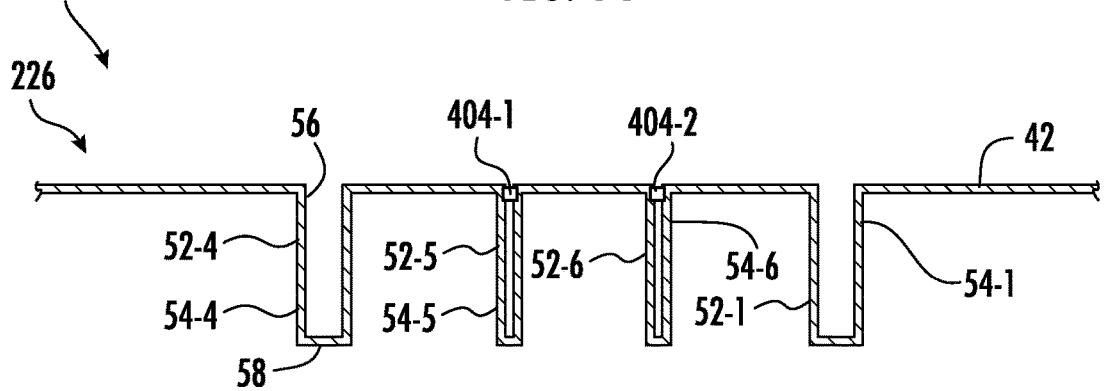

As shown by FIG. 12, second layer 42 is folded or shaped to form folds 52-1, 52-4, 52-5 and 52-6 which form trough walls 54-1, 54-4, 54-5 and 54-6, respectively. As with trough walls 64, trough walls 54 each include a top 56 having an open mouth and a bottom 58. In the example illustrated, the top 56 of trough walls 54-5 and 54-6 are closed by connectors 404-1 and 404-2. As discussed above, in some implementations, connectors 404 may be formed by stitching across the opposite side walls of the trough walls 54. The tops 56 of trough walls 54-1 and 54-4 are left open for the subsequent reception of trough walls 64-1 and 64-3, respectively. In FIG. 12, in one implementation, when connectors 404-1 and 404-2 are stitchings, the stitchings can be aligned in a generally horizontal direction with respect to the orientation of panel 20 in FIG. 12. In other implementations, the stitchings can be aligned in a generally vertical direction, or in other angled positions.

Figure 13:
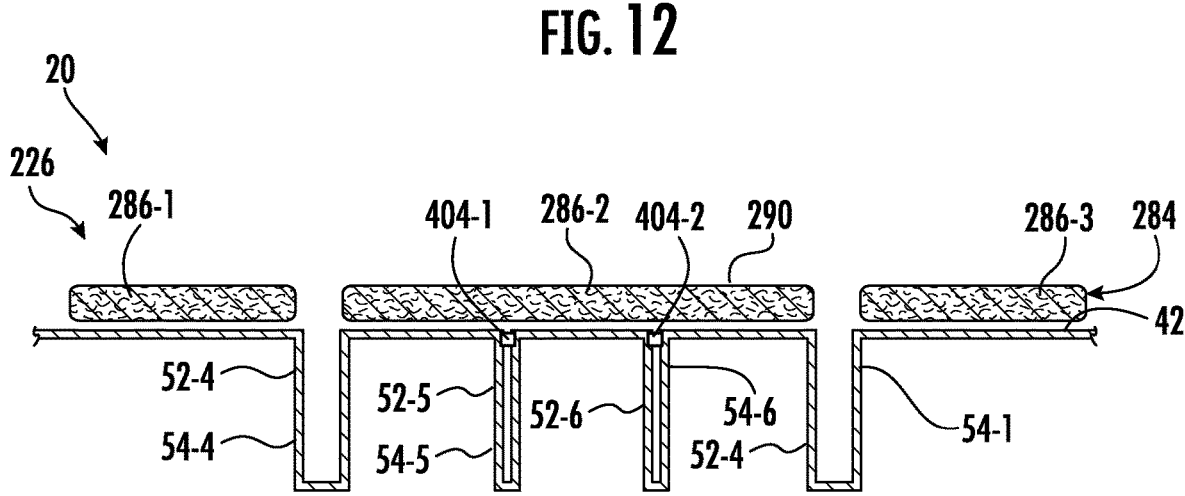
Figure 14:
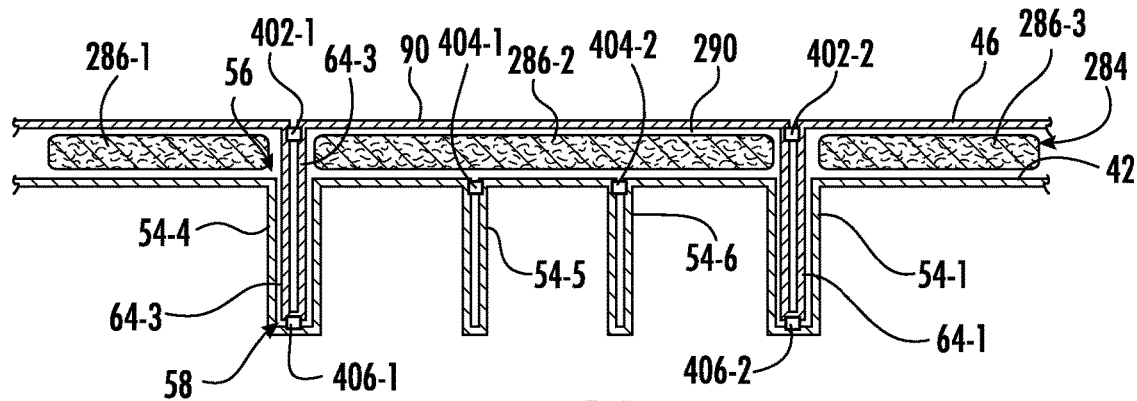

As shown by FIG. 13, insulating layer 284 is located on top of second wall 42. In particular, portion 286-2 is located between trough walls 54-1 and 54-4, extending directly on top of and over connectors 404 and trough walls 54-5 and 54-6. Portions of insulating layer 284 are separated from one another directly above trough walls 54-1 and 54-4 for the subsequent insertion of trough walls 64-1 and 64-2 into trough walls 54-1 and 54-4, respectively As shown by FIG. 14, the second layer 46 prepared in FIG. 11 is overlaid upon the intermediate assembly of FIG. 13 with trough layers 64-1 and 64-3 being inserted into trough layers 54-4 and 54-1, respectively. Thereafter, trough walls 624-3 and 64-1 are connected or secured within trough layers 54-4 and 54-1, respectively, by connectors 406-1 and 406-2. As discussed above, in some implementations, connectors 406-1 and 406-2 are formed by stitching through the material of trough wall 54-4 into trough wall 64-3 and through wall 54-1 and into trough wall 64-1. In FIG. 14, in one implementation, when connectors 406-1 and 406-2 are stitchings, the stitchings can be aligned in a generally vertical direction with respect to the orientation of panel 20 in FIG. 14. In other implementations, the stitchings can be aligned in a generally horizontal direction, or in other angled positions. In other implementations, a mass of adhesive may be provided to form connectors 406. In some implementations, an adhesive may be applied along interior sides and/or the floor of each of trough walls 54-4 and 54-1.

Figure 15:
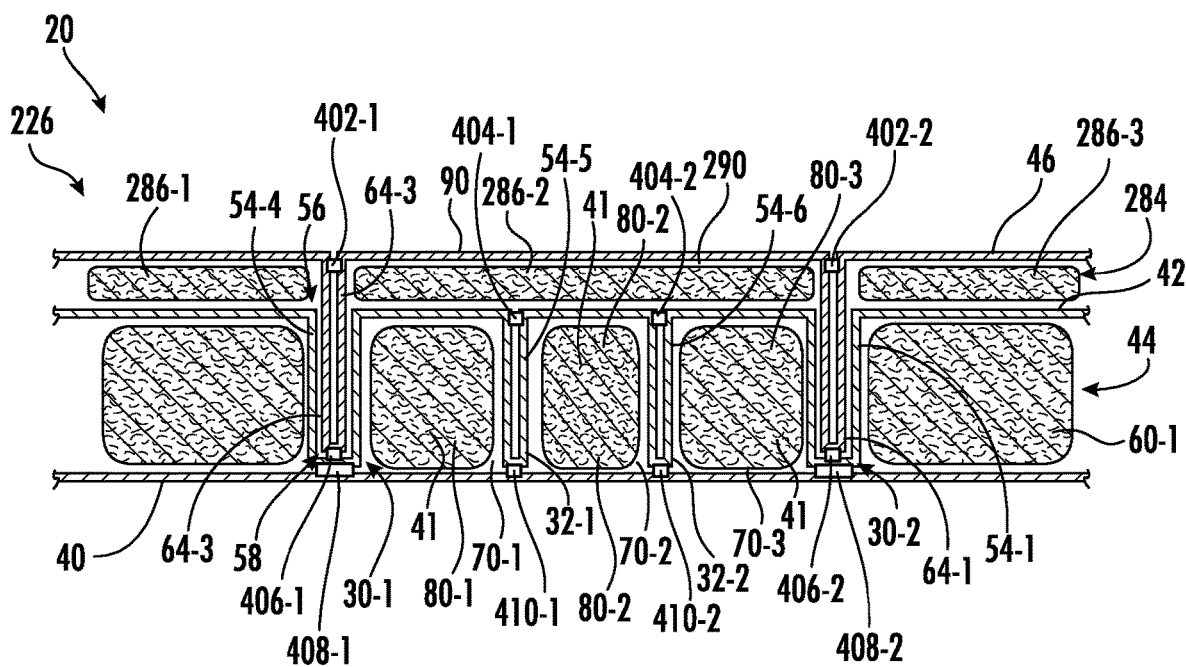

As shown by FIG. 15, the various portions of insulating layer 44 are located within the partially formed compartments 70-1, 70-2 and 70-3. Thereafter, the intermediate assembly of FIG. 15 is secured to first wall 40, in some implementations, the liner of the garment. In particular, connectors 408-1, 408-2, 410-1 and 410-2 are formed to connect and secure trough walls 54-4, 54-5, 54-6 and 54-1 to first wall 40. As discussed above, in some implementations, connectors 408 and 410 may be formed by stitching. In some implementations, connectors 406-1 and 408-1 and connectors 406-2 and 408-2 may be provided by single stitching operation, wherein the stitching extends through first wall 40, through trough wall 54-4 and 54-1 and into or through trough walls 64-1 and 64-2. In one implementation, when connectors 408-1 and 408-2 and connectors 410-1 and 410-2 are stitchings, the stitchings can be aligned in a generally vertical direction with respect to the orientation of panel 20 in FIG. 15. In other implementations, the stitchings can be aligned in a generally horizontal direction, or in other angled positions.

In some implementations, the order of the various processes shown in FIGS. 11-15 may be varied. For example, the fabrication steps shown in FIGS. 11-15 may be carried out in any order. In some implementations, the second layer 42 may be connected to first layer 40, with the inserted portions of insulation layer 44, prior to the positioning of the insulation layer 284 and the joining of third layer 46.

Figure 16:
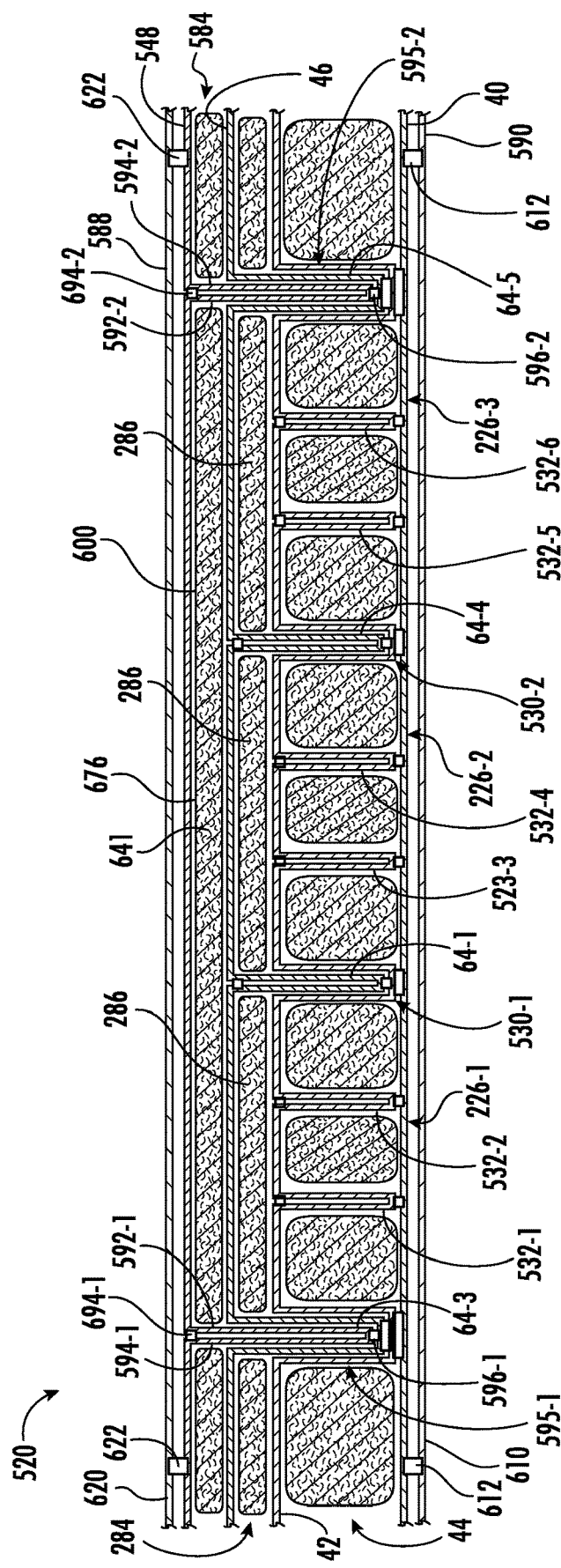
FIG. 16 is a sectional view of portions of an example baffled insulating garment/blanket panel.

FIG. 16 is a sectional view of an example baffled insulating panel 520 which may be utilized as part of a blanket or a garment, such as garment 120. Insulating panel 520 comprises multiple consecutive individual regions, each of which is similar to region 226 described above. Insulating panel 520 comprises additional trough walls, additional insulating layers and additional layers for enhanced insulation and an even lower density of outer or exposed stitches/connectors/folds per surface area of the blanket or garment. FIG. 16 illustrates three consecutive baffled regions 226-1, 226-2, and 226-3 (collectively referred to as baffled regions 226) which include a third layer 46 having folds so as to form trough walls 64-1, 64-3 (described above with respect to the baffled region 226 shown in FIG. 10) as well as trough walls 64-4 and 64-5 which form baffled region 226-2 and baffled region 226-3, respectively.

As shown by FIG. 16, in addition to the structures described above with respect to each of the baffled regions 226 (and numbered similarly in FIG. 16), panel 520 comprises fourth layer 548, insulating layer 584, fifth layer 588 and sixth layer 590. Fourth layer 548 comprises a continuous layer of flexible material, such as a fabric, a perforate, breathable material or an imperforate material. Fourth layer 548 comprises folds 592-1 and 592-2 which form trough-shaped trough walls 594-1, 594-2 (collectively referred to as walls 594). Trough walls 594-1 and 594-2 are closed by connectors 694-1 and 694-2, respectively. Connectors 694-1 and 694-2 may comprise stitching, adhesive, welds and the like.

Similar to trough walls 64-1 and 64-3, trough walls 594-1 and 594-2 project into and are secured within an underlying trough wall over and underlying layer. In the example illustrated, trough walls 594-1 and 594-2 project into corresponding trough walls 64-1 and 64-4. Trough walls 594-1 and 594-2 cooperate with the underlying trough walls to form triple walled baffles 595-1, 595-2 which may have a larger stiffness as compared to the double walled baffles 530-1, 530-2 and the single walled baffles 532-1, 532-2, 532-3, 532-4, 532-5 and 532-6.

Trough walls 594-1 and 594-2 are secured and connected to trough walls 64-3 and 64-5 by connectors 596-1 and 596-2 (collectively referred to as connectors 596. Connectors 596 may be formed by stitching, adhesive, welding or other connection structures.

Trough walls 594-1 and 594-2 cooperate with third layer 46 to form baffle compartment 600. Baffle compartment 600 spans across and over double walled baffles 530-1, 530-2 between triple walled baffles 595-1, 595-2. Baffle compartment 600 receives portion 676 of insulating layer 584. Portion 676 is composed of insulating particles 641 which may comprise down, natural fibers, synthetic fibers or combinations thereof. In some implementations, portion 676 may be composed of insulating particles similar to that of insulating layer 284 and/or insulating layer 44. In some implementations, insulating layer 584 may have a thickness less than the thickness of insulating layer 284.

As shown by FIG. 16, portion 676 of insulating layer 584 is captured within compartment 600 and spans or extends over double walled baffles 530-1 and 530-2. As a result, portion 676 further provides a layer of cushioning over the juncture of portions 286 as well as single and double walled baffles. In addition, fourth layer 548 further provides panel 520 with a lower density of folds/seams along the surface of fourth layer 548. In the example illustrated, for each of the lowermost 10 baffles secured to first layer 40, the exterior of layer 548 has two exposed folder seams, 592-1 and 592-2. In some implementations, insulating layer 584 may be omitted.

As further shown by FIG. 16, panel 520 may comprise additional inner and outermost liners or layers. In the example illustrated, panel 520 comprises an additional innermost liner or layer 610 secured to layer 40 by connectors 612. Connectors 612 may be in the form of stitching, adhesives, welds or the like. Panel 520 additionally comprise an outermost self or layer 620 connected to layer 548 by connectors 622. Connectors 622 may be in the form of stitching, adhesive, welds or the like. In some implementations, one or both of layers 610 and 620 may be imperforate to block moisture or wind. In some implementations, one or both of layer 610 and 620 may be perforate or breathable. Layers 610 and 620 may protect layers 40 and 548 or may provide different outer surface finish for the garment or blanket employing panel 520. In some implementations, layer 610 and/or layer 620 may be omitted.

Particle Loss Testing

The above example baffled insulating garment/blanket panels can reduce the number of insulating particles that protrude or escape from the panels during laundering. An evaluation or rating of the downproofness of a down panel or garment made from down panels may be made using the following particle loss test. In one example testing, a specimen garment in the form of a vest or a jacket having baffled sections 226 described above on both its front and back panels and having a surface area of 1.37 m² underwent the following particle loss test. The insulating layers 44 were composed of 850 down fill applied at 80 g/m². Layer 40 was formed from #313002 Toray while layers 42 and 46 were formed from #22467 Toray. The insulating layer 284 was composed of 850 down fill applied at 30 g/m². Layer 44 had a thickness of 2 cm while layer 284 had a thickness of between two and 3 mm. The connectors were in the form of stitching. Prior to laundering, inspection of the vest revealed three individual pieces are particles of down on its exterior, wherein such pieces were removed prior to laundering.

During laundering, the sample vest was placed in a polyester mesh bag having a porosity so as to prevent the escape of any down pieces as particles. During laundering, the vest, within the polyester bag drying, the bag with the vest was placed in a large box having an interior of at least 60+/−1 cm×60+−1 cm×60+−1 cm at a rotating speed of 42 revolutions per minute in a forward direction for 1440 revolutions (a large box test). The selection of the large box test was based upon the garment having a length of greater than 40 cm. For garments less than 40 cm, a small box test may be used, wherein the small box has an interior of 45+/−0.8×45+/−0.8×45+/−0.8 cm with 16 rubber or silicone stoppers. When a large box test is used, 24 rubber or silicone stoppers are used within the bag during testing.

The washing machine complies with the description of ISO Standard, ISO 6330-2012 (Annex A). The machine is rotated at a speed of 45 revolutions per minute at a forward speed for 1440 revolutions. The vest was washed pursuant to recommendations provided on the vest. In the particular example, the vest was washed at a cold temperature of 30° C. and dried at a low temperature of between 40° C. and 50° C. Each wash cycle lasted 45 minutes while the dry cycle lasted until the vest was completely dry. The water cycle was a "normal" water cycle in accordance with ISO 6330-2012 (Annex A) while the dry cycle was a tumble dry cycle in accordance with ISO Standard, ISO 6330-2012 (Annex G). During such testing, 24 individual stoppers are deposited into the polyester bag along with the vest. As should be appreciated, the number of individual rubber stoppers and their individual size may vary as they are simply used to attract released particles. The rubber stoppers attract any released particles. To facilitate turning of the vest during drying, three standard tennis balls were placed in the dryer, outside of the polyester bag during drying. Three complete laundering cycles were performed prior to any inspection.

Following three wash/dry times, the garment and rubber stoppers were inspected. No insulating particles were found on the specimen vest. Two insulating particles were found on the rubber stoppers. No insulating particles were found on the surface of the box. A total of two insulating particles were found, indicating a loss of 1.46 particles per square meter of the garment. In another test of a garment, wherein the garment was a jacket having a garment surface area of 1.90 m², the jacket was placed into a large box and tested (washed) in accordance with ISO 6330-2012 (Annex A) while the dry cycle was a tumble dry cycle in accordance with ISO Standard, ISO 6330-2012 (Annex G), in the manner described above. Following three wash/dry times, the jacket and rubber stoppers were inspected. Two insulating particles were found on the specimen jacket. No insulating particles were found on the rubber stoppers. No insulating particles were found on the surface of the box. A total of two insulating particles were found, indicating a loss of 1 particles per square meter of the garment.

Down proofness of a down garment may be generally evaluated in terms of lost pieces or particles protruding or escaping from a garment per square meter of the garment. A "lost" particle is a particle that is protruding from or that is completely separated from the garment. A "Superior" quality rating is achieved when a specimen garment experiences a loss of less than or equal to 40 particles per square meter. A "First-Class" quality rating for garment is achieved when a garment experiences a particle loss of less than or equal to 70 insulating particles or down particles per square meter. A "Qualified" rating is achieved when a garment experiences a particle loss of less than or equal 120 particles per square meter. The baffled insulating garment/blanket panel described above, following three laundering cycles, lost less than or equal to 20 particles per square meter of the panel. The baffled insulating garment/blanket panel described above, following three laundering cycles, lost less than or equal to five particles per square meter of the panel. The above test demonstrated that a garment formed with the baffled insulating garment/blanket panel construction may achieve a "Superior" down garment downproofness rating. Accordingly, in the two example downproofness tests described above, the vest and the jacket, both produced in accordance with implementations of the present invention, resulted in downproofness values (pieces/m²) of less than 2, well within the Superior Quality downproofness rating of less than or equal to 40 pieces/m².

Garments produced in accordance with above-described implementations can have Superior Quality downproofness ratings, when tested in downproofness tests as described above, of less than or equal to 40 pieces/m². Garments produced in accordance with above-described implementations can have Superior Quality downproofness ratings of less than or equal to 20 pieces/m². Garments produced in accordance with above-described implementations can have Superior Quality downproofness ratings of less than or equal to 5 pieces/m².

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A baffled insulating garment comprising:
   a first layer;
   a second layer having folds forming trough-shaped walls comprising a first trough-shaped wall, a second trough-shaped wall and a third trough-shaped wall, wherein each of the first trough-shaped wall, second trough-shaped wall and the third trough-shaped wall forms a trough interior having has a trough interior floor extending along a centerline and a trough interior mouth and wherein the trough interior floor is secured adjacent to the first layer;
   an insulating particle layer comprising:
      a first portion between the first trough-shaped wall and the second trough- shaped wall and sandwiched between the first layer and the second layer; and
      a second portion between the second trough-shaped wall and the third trough-shaped wall and sandwiched between the first layer and the second layer; and
   a third layer having folds forming a series of trough-shaped walls comprising fourth and fifth consecutive trough-shaped walls, the fourth trough-shaped wall being secured within the trough interior of the first trough-shaped wall and the fifth trough-shaped wall secured within the trough interior of the third trough-shaped wall, wherein portions of the third layer between the fourth trough-shaped wall and the fifth trough-shaped wall form a bridge region spanning over and across the trough interior and the trough interior mouth of the second trough-shaped wall such that the bridge region is outside of the trough interior of the second trough-shaped wall when crossing the centerline of the trough interior floor of the second trough-shaped wall.

2. The baffled insulating garment of claim 1, wherein the fourth trough-shaped wall and the fifth trough-shaped wall are secured to trough interior floors of the first trough-shaped wall and the third trough-shaped wall, respectively.

3. The baffled insulating garment of claim 2, wherein the trough interior mouth of the second trough-shaped wall is secured in a closed state.

4. The baffled insulating garment of claim 3, wherein the fourth trough-shaped wall has a trough interior floor and a trough interior mouth, wherein the trough interior mouth of the fourth trough- shaped wall is secured in a closed state.

5. The baffled insulating garment of claim 1 further comprising a second insulating particle layer having a portion continuously extending between the fourth trough-shaped wall and the fifth trough- shaped wall and sandwiched between the second layer and the third layer, the portion of the second insulating particle layer spanning the trough interior mouth of the second trough-shaped wall.

6. The baffled insulating garment of claim 5, wherein the insulating particle layer has a first thickness and wherein the second insulating particle layer has a second thickness less than the first thickness.

7. The baffled insulating garment of claim 1, wherein the first trough-shaped wall, the second trough-shaped wall, the third trough-shaped wall, the fourth trough-shaped wall and the fifth trough-shaped wall are parallel.

8. The baffled insulating garment of claim 1, wherein the first trough-shaped wall, the second trough-shaped wall, third trough-shaped wall, the fourth trough-shaped wall and the fifth trough-shaped wall are configured to be horizontal when the garment is being worn.

9. The baffled insulating garment of claim 1, wherein the folds of the second layer form a sixth trough-shaped wall forming a trough interior having a trough interior floor and a trough interior mouth, the sixth trough-shaped wall being located between the second trough-shaped wall and the third trough-shaped wall, wherein the insulating particle layer comprises a third portion between the second trough-shaped wall and the third trough-shaped wall and sandwiched between the first layer and the second layer, wherein the trough interior floor of the sixth trough- shaped wall is secured adjacent to the first layer and wherein portions of the third layer span over and across the trough interior and the trough interior mouth of the sixth trough-shaped wall.

10. The baffled insulating garment of claim 9 further comprising a second insulating particle layer having a portion continuously extending between the fourth trough-shaped wall and the fifth trough- shaped wall and sandwiched between the second layer and the third layer, the portion of the second insulating particle layer spanning over and across the trough interior mouth of the second trough-shaped wall and the trough interior mouth of the sixth trough-shaped wall.

11. The baffled insulating garment of claim 9, wherein the second trough-shaped wall and the sixth trough-shaped wall of the second layer are spaced from one another by at least 4 cm and no greater than 9 cm.

12. The baffled insulating garment of claim 1, wherein the trough-shaped walls of the second layer have a height of at least 1 cm and no greater than 5 cm.

13. The baffled insulating garment of claim 1, wherein the fourth trough-shaped wall and the fifth trough-shaped wall are spaced by at least 10 cm and no greater than 30 cm.

14. The baffled insulating garment of claim 1, wherein the first trough-shaped wall, the second trough-shaped wall and the third trough-shaped wall are secured to a face of the first layer by stitching and wherein the fourth trough-shaped wall and the fifth trough-shaped wall are secured to the first trough-shaped wall and the third trough-shaped wall by stitching.

15. The baffled insulating garment of claim 1, wherein the garment comprises stitched seams and is configured such that, following three laundering cycles, the garment loses less than or equal to 20 particles from the insulating particle layer per square meter of the garment.

16. The baffled insulating garment panel of claim 1, wherein the garment comprises stitched seams and is configured such that, following three laundering cycles, the garment loses less than or equal to five particles from the insulating particle layer per square meter of the garment.

17. The baffled insulated garment of claim 1, wherein is a coat or a jacket.

18. The baffled insulating garment of claim 1, wherein portions of the first layer extend in a first plane and wherein portions of the bridge region extending over and across the trough interior of second trough- shaped wall extending a second plane parallel to the first plane.

19. A baffled insulating garment comprising:
 a first layer;
 a second layer having folds forming trough-shaped walls comprising a first wall, a second wall and a third wall, wherein each of the first wall, second wall and the third wall has a trough bottom and a trough top and wherein the trough bottom is secured adjacent to the first layer; and
 first insulating particle layer comprising:
  a first portion between the first wall and the second wall and sandwiched between the first layer and the second layer; and
  a second portion between the second wall and the third wall and sandwiched between the first layer and the second layer;
 a third layer having folds forming consecutive trough-shaped walls comprising a fourth wall secured within the first wall and a fifth wall secured within the third wall, wherein portions of the third layer between the fourth wall and the fifth wall span over and across the trough top of the second wall; and
 a second insulating particle layer having a portion continuously extending between the fourth wall and the fifth wall and sandwiched between the second layer and the third layer, the portion of the second insulating particle layer spanning the trough top of the second wall.

\* \* \* \* \*